United States Patent [19]
Perlman et al.

[11] Patent Number: 5,574,860
[45] Date of Patent: Nov. 12, 1996

[54] METHOD OF NEIGHBOR DISCOVERY OVER A MULTIACCESS NONBROADCAST MEDIUM

[75] Inventors: Radia J. Perlman, Acton; Charles W. Kaufman, Northborough; Christopher W. Gunner, Harvard, all of Mass.

[73] Assignee: Digital Equipment Corporation, Maynard, Mass.

[21] Appl. No.: 29,815

[22] Filed: Mar. 11, 1993

[51] Int. Cl.⁶ .............................. H04B 3/00; H04J 13/00; H04J 3/00

[52] U.S. Cl. .............................. 395/200.06; 395/200.02; 395/200.03; 395/200.1; 395/200.11; 395/200.15; 370/94.1; 370/16; 340/825.02; 340/825.30; 340/825.31; 340/825.50; 340/825.51; 340/825.52; 340/825.53; 380/73; 380/29

[58] Field of Search .............................. 395/200, 325; 370/85–86, 16, 95 T, 94 T; 380/23, 29; 340/825.02, 825.30, 825.31, 825.50–825.53

[56] References Cited

U.S. PATENT DOCUMENTS

| | | | |
|---|---|---|---|
| 4,466,060 | 8/1984 | Riddle | 395/325 |
| 4,595,921 | 6/1986 | Wang et al. | 340/825.08 |
| 4,651,318 | 3/1987 | Luderer | 370/60 |
| 4,747,100 | 5/1988 | Roach et al. | 370/86 |
| 4,847,830 | 7/1989 | Momirov | 370/94 |
| 4,995,035 | 2/1991 | Cole et al. | 370/95.2 |
| 5,018,133 | 5/1991 | Tsukakoshi et al. | 370/16 |
| 5,051,987 | 9/1991 | Conlon | 370/94.1 |
| 5,093,824 | 3/1992 | Coan et al. | 370/16 |
| 5,101,348 | 3/1992 | Arrowood et al. | 395/200 |
| 5,109,484 | 4/1992 | Hughes et al. | 395/200 |
| 5,140,586 | 8/1992 | Kloper et al. | 370/85.5 |
| 5,327,534 | 7/1994 | Hutchison et al. | 395/200 |
| 5,351,295 | 9/1994 | Pearlman et al. | 380/23 |
| 5,394,436 | 2/1995 | Meier et al. | 375/1 |
| 5,408,610 | 4/1995 | Arakawa | 395/200 |

Primary Examiner—Gail O. Hayes
Assistant Examiner—Felicia Ives
Attorney, Agent, or Firm—Kenneth F. Kozik

[57] ABSTRACT

A technique for generating, distributing and maintaining a list of operational nodes in a network using a nonbroadcast communication medium, wherein the nodes first collectively agree on the identity of a designated node. Once the designated node is agreed on, the other nodes periodically send Hello messages to it and the designated nodes compiles a list of operational nodes based in part on the Hello messages it receives, and periodically sends a Hello message to each node on the list. The Hello message from the designated node includes a list of addresses of active neighbor nodes, so that every node periodically receives a list of operational neighbor nodes. The number of messages needed to implement this scheme is proportional to the number of nodes, rather than the square of the number of nodes as in a conventional approach in which each node advised every other node of its presence. Selection of the designated node can be on the basis of some unique property of each node, such as identification number or an encoded priority.

14 Claims, 4 Drawing Sheets

METHOD OF NEIGHBOR DISCOVERY OVER A MULTIACCESS NONBROADCAST MEDIUM

BACKGROUND OF THE INVENTION

This invention relates generally to communication networks and, more particularly, to techniques for stations or nodes connected to a network to be aware of each others' connection to and departure from the network. Commonly used network layer protocols require neighbors on a communication network to find each other dynamically, to be able to map network layer addresses to data link layer addresses, and to know quickly when a neighbor "dies." The terms "network layer" and "data link layer" can be best understood from a brief background description of computer networks in general.

A computer network is a collection of autonomous computers connected together to permit sharing of hardware and software resources, and to increase overall reliability. The term "local area network" (LAN) is usually applied to computer networks in which the computers are located in a single building or in nearby buildings, such as on a college campus or at a single corporate site. A bridge is a device that is connected to at least two LANs and serves to pass message frames or packets between LANs, such that a source station on one LAN can transmit data to a destination station on another LAN, without concern for the location of the destination. Bridges are useful and necessary network components, principally because the total number of stations on a single LAN is limited. Bridges can be implemented to operate at a selected layer of protocol of the network. A detailed knowledge of network architecture is not needed for an understanding of this invention, but a brief description follows by way of further background.

A widely accepted model for network architectures is known as the International Standards Organization (ISO) Open Systems Interconnection (OSI) reference model. The OSI reference model is not itself a network architecture, but rather it specifies a hierarchy of protocol layers and defines the function of each layer in the network. Each layer in one computer connected to the network communicates with the corresponding layer in another computer connected to the network, in accordance with a protocol defining the rules of this communication. In reality, information is transferred down from layer to layer in one computer, then through a channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

The functions of finding neighboring nodes and mapping network layer addresses to data link layer addresses are relatively simple to implement in many conventional local area networks, and involve "multicasting" of messages on the LAN. A multicast message is one that is transmitted simultaneously to multiple destination nodes. If each active node sends a multicast message advertising its presence on the network, all of the other nodes are immediately aware of all of the active nodes on the network. Unfortunately, this simple approach is not available when the nodes are connected to certain types of telecommunications systems, such as SMDS (Switched Megabit Data Service) or X.25, since these media do not support the multicast capability in an efficient manner.

An obvious solution to this problem would be for each node to announce its presence on the network by sending a "Hello" message to every other node. But this is highly inefficient and costly because it requires a number of messages roughly proportional to $N^2$, where N is the number of nodes. This overhead is most significant in a system in which each message transmitted incurs an incremental cost. Another solution would be to manually configure each of the nodes, such that each node starts operation with a preprogrammed knowledge of the identities of all of the other nodes. For relatively large systems, manual configuration is impractical. Any change in configuration, even if adding or deleting only one new node, requires reconfiguration of all of the remaining nodes.

Accordingly, there is a need for a new technique for automatically generating and updating a list of active nodes and distributing it to the nodes. Preferably, the new approach should be less costly in terms of the communication channel bandwidth it uses to accomplish this goal. The present invention meets this need.

SUMMARY OF THE INVENTION

The present invention resides in a method, and corresponding apparatus, for generating, distributing and maintaining a list of active nodes, whereby the overhead incurred in accomplishing this goal is proportional to the number of nodes N, rather than to $N^2$. Briefly, and in general terms, the method of the invention comprises the steps of, first, manually configuring each of multiple nodes connected to the network, such that each node is aware of a subset of operational nodes in the network; then collectively agreeing, among all of the operational nodes connected to the network, on a designated node. Once the designated node is agreed upon, the method further includes periodically sending a hello message of a first type to the designated node from each other node, wherein each hello message of the first type identifies the sending node and addresses that the sending node has been configured with for reaching other nodes; and periodically sending a hello message of a second type from the designated node to each of the other nodes, wherein each hello message of the second type contains a list of all of the operational nodes, as derived in part from received hello messages of the first type.

More specifically, the step of collectively agreeing upon a designated node includes performing a sequence of steps in each node. The first step is initially assuming that this node is the designated node and sending periodic hello messages of the second type to each known other node. Then, if this node receives a hello message of the second type from a node better qualified than this node's current selection for designated node, this node responds by changing its current selection for designated node to the node from which the hello message of the second type was received.

Further, if this node is not the designated node and it receives a hello message of the second type from a node not better qualified than this node's current selection for designated node, this node responds by sending a hello redirect message to the node from which the hello message of the second type was received, to inform the latter node that there is a more qualified choice for designated node. Finally, if this node receives a hello redirect message from another node, this node responds by sending a hello message of the first type to a new candidate for designated node.

Therefore, each node starts out assuming it is the designated node, and may change this current selection for designated node upon receiving a hello message from a better qualified candidate. A hello message (of the second type) from a node that is not better qualified indicates that the sending node is not aware of a better qualified candidate for designated node. In this case, a hello redirect message is used to inform the sending node of the better qualified node. A recipient of a hello redirect message sends a hello message to the better qualified candidate, and will probably receive a hello message of the second type from that candidate in due course, at which time this node can change its current selection for designated node. Since all of the nodes follow this procedure, agreement is quickly reached as to the identity of the designated node. The designated node is selected on the basis of some unique property of each node, such as identification number, address, encoded priority, or some combination of these identifying items.

As further described below, the step of periodically sending a hello message of the second type from the designated node to each of the other nodes includes compiling a composite node list from four sources: (i) the addresses that the designated node has been manually configured with, (ii) the addresses that other nodes have been manually configured with, as learned from received hello messages of the first type, (iii) the addresses of nodes from which the designated node has received hello messages of the first type, and (iv) any multicast addresses used by other nodes from which the designated node has received a hello message of the first type. This step of compiling a composite list further includes eliminating duplicate entries in the list, to minimize the number of hello messages of the second type. If the communication system has the ability to handle multicast or group addressing of nodes, only a single hello message will be sent to the entire group, rather than separate messages to each member of the group.

In accordance with another aspect of the invention, the step of periodically sending a hello message of the second type includes fragmenting the hello message of the second type into multiple data packets, if the message is too long to fit into one packet, and including in each fragment of the hello message an address range spanning all of the node addresses included in the fragment. Sending a range of node addresses with each fragment facilitates detection of and recovery from transmission errors in which packets may be lost, since nodes receiving the fragmented hello message can more easily determine whether any portion of the hello message is missing.

In the method as illustrated in this specification, each node sending a hello message of the first type to the designated node also performs the subsequent steps of waiting for a preselected time interval to detect a hello message of the second type from the designated node; and, if a hello message of the second type is not received within the preselected time interval, assuming again that this node is the designated node and sending periodic hello messages of the second type to all the other known nodes. In such an event, there would follow a further exchange of hello messages to select a designated node.

In terms of apparatus, the invention comprises means for manually configuring each of multiple nodes connected to a communication network, such that each node is aware of a subset of operational nodes in the network; means for collectively agreeing, among all of the operational nodes connected to the network, upon a designated node; means in each node for periodically sending a hello message of a first type to the designated node from each other node, wherein each hello message of the first type identifies the sending node and the addresses that the sending node has been configured with for reaching other nodes; and means in each node for periodically sending a hello message of a second type from the designated node to each of the other nodes, wherein each hello message of the second type contains a list of all of the operational nodes, as derived in part from received hello messages of the first type.

The invention may also be expressed in other, more specific apparatus terms, corresponding approximately in scope to the method form of the invention summarized above.

It will be appreciated from the foregoing that the present invention represents a significant advance in the field of network communications using nonbroadcast media. In particular, the invention provides a convenient and more efficient technique for operational nodes to discover the identities of their neighbors. Other aspects and advantages of the invention will become apparent from the following more detailed description, taken in conjunction with the accompanying drawings.

DESCRIPTION OF THE PREFERRED EMBODIMENT

Figure 1:
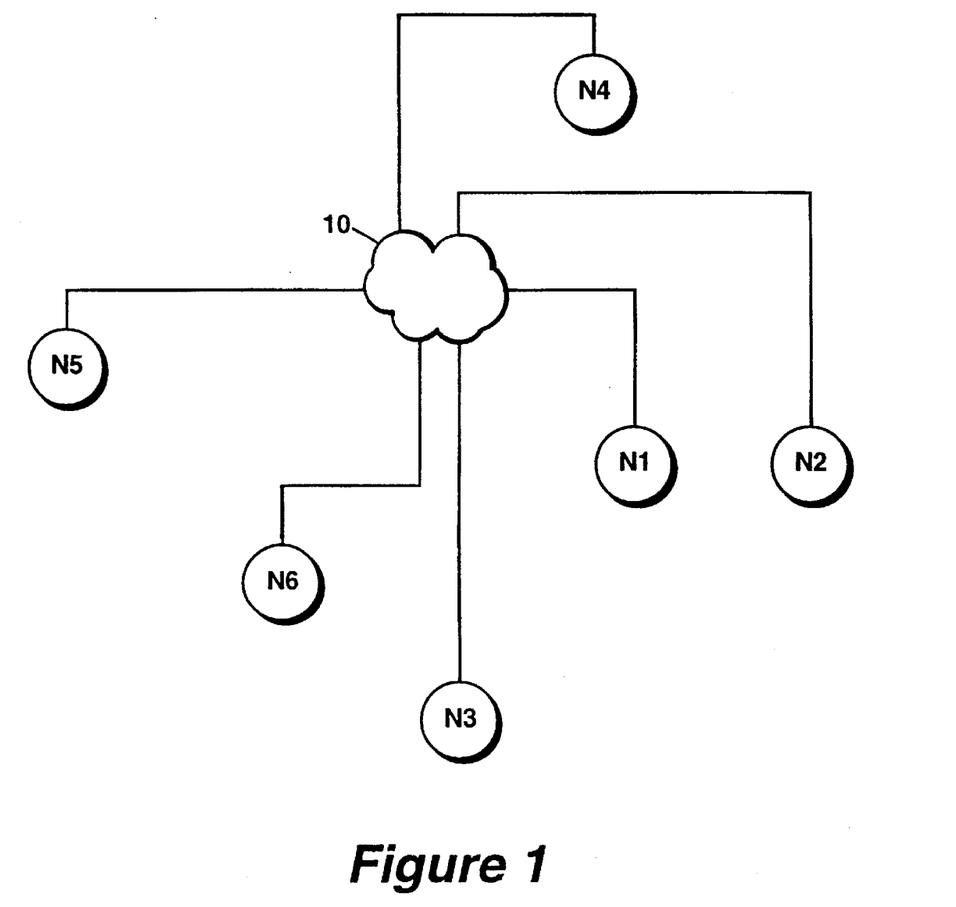
FIG. 1 is a diagrammatic view of a network of which five nodes are shown by way of illustration.

As shown in the drawings by way of illustration, the present invention is concerned with a technique for generating, distributing and updating a list of stations or nodes connected to an interconnected network, such as the one shown diagrammatically in FIG. 1. The network, indicated by the diagrammatic cloud 10, includes multiple stations or nodes, five of which are indicated by circles having the designations N1, N2, N3, N4 and N5. In most conventional local area networks (LANs), keeping track of which nodes are active is simply a matter of transmitting periodic or occasional multicast messages from each node. Such messages may be transmitted to all of the other nodes, which will then be aware of the identities of all of the active nodes on the network.

The present invention is directed to the special, but not uncommon situation in which the network medium is of the nonbroadcast type, i.e. does not support the transmission of multicast messages, or does not support efficient multicast transmission. Having each node send "Hello" messages to all the other nodes is too costly in terms of medium bandwidth usage, and manually configuring all of the nodes, initially and after every configuration change, is impractical.

In accordance with the present invention, each node is partially manually configured, including the identities of a small subset of nodes connected to the network; and then a complete list of nodes is generated, and updated as needed, by an exchange of messages, the number of which is proportional to the number of nodes. More specifically, the nodes elect a unique "designated node;" then each node other than the designated node periodically advertises its presence to the designated node, which responds by sending back a complete list of nodes.

Partial manual configuration simply means that each node is initially aware of the presence of some nodes in the network. For example, in FIG. 1 the partial configuration lists of nodes N1–N5 may be as follows:

N1 list: N2, N3,

N2 list: N1,

N3 list: N1, N4,

N4 list: N3, N5,

N5 list: N1.

There are two types of Hello message involved in the protocol of the invention. Each node other than the designated node sends a Hello message to the designated node, and the designated node sends a hello message (referred to as the DN Hello message) back to each of the other nodes. Initially, such as when the network begins operating or is reinitialized for some reason, each node assumes that it is the designated node and begins sending DN Hello messages to all the nodes that it knows about, that is to all of the nodes on its partial configuration list. Therefore, using the partial configuration example described above, after each node has sent its DN Hello messages, the nodes will receive DN Hello messages as follows:

N1 receives from N2, N3 and N5,

N2 receives from N1,

N3 receives from N1 and N4,

N4 receives from N3,

N5 receives from N4.

The designated node may be selected on any consistent basis, such as node identification, node address, a priority encoded into the node, or some combination of factors. For purposes of illustration, it will be assumed that the node identification is used to select the designated node, and that node N1 will be eventually be designated because it has the smallest identifying number. The protocol of the invention requires that each node have a current selection for designated node, which is initially set to the node's own identification, but is changed based on the nature of DN Hello messages that the node receives.

In the example, node N1 receives DN Hello messages from nodes N2, N3 and N5, but recognizes that none of nodes that sent these messages has a higher priority than itself. Therefore, node N1 continues to regard itself as the designated node.

Node N2 receives a DN Hello message from node N1, which it recognizes as a higher priority than its current selection for designated node (N2). Therefore, node N2 changes its current selection to N1 and begins to send periodic Hello messages to N1.

Node N3 receives DN Hello messages from N1 and N4. As a result, node N3 also changes its current designated node to N1. Further, Node N3 recognizes that the DN Hello from Node N4 was misdirected. A Hello Redirect message is sent to node N4, informing N4 that the designated node is believed to be N1.

Node N4, which first receives a DN Hello message from N3, changes its current designated node to N3. Then the Hello Redirect message is received from N3, so N4 sends a Hello message to N1 and subsequently receives a DN Hello message from N1. N4 recognizes that N1 is a better qualified designated node than N3, and changes its current designated node to N1.

Finally, node N5 first receives a DN Hello message from node N4, which is recognized as more qualified to be the designated node than N5. So node N5 changes its current designated node to N4.

Thus, as a result of this exchange of messages nodes N1, N2, N3 and N4 have correctly identified node N1 as the designated node, but node N5 still believes that node N4 is the designated node. The situation with regard to N5 is eventually corrected because node N1 will accumulate a node list from each of the nodes from which it receives a Hello message. Specifically, node N1 will learn of the presence of node N5 from node N4, so node N1 will send a DN Hello message to node N5. The result will be that node N5 will recognize N1 as more qualified than N4 to be the designated node, and will change its (N5's) current selection to N1. Then there will be unanimous agreement as to the identity of the designated node.

Once the designated node is known to all the other nodes, each node sends a Hello message periodically to the designated node, and the designated node periodically sends a DN Hello message to all of the nodes. Since the DN Hello message includes a complete list of nodes, all of the nodes are aware of the identities of the other nodes connected to the network.

Reconfiguration is a relatively simple matter. If a new node joins the network, it need only be manually configured to include at least one of the already operational nodes. For example, a new node N6 could be manually configured to be aware of N5. Node N6 would initially send a DN Hello message to N5; node N5 would send a Hello Redirect message back, indicating that N1 was a better qualified designated node; node N6 would send a Hello message to node N1; node N1 would add node N1 to its list and send N1 a DN Hello message; and then node N6 would change its current selection of designated node to node N1. In this way the technique of the invention quickly and automatically adjusts to configuration changes. Nodes dropping from the network are detected by the designated node when Hello messages are not received, and the designated node updates its list and sends copies to the other nodes with the DN Hello messages. If the designated node itself drops out of the network, each other node will again assume that it is the designated node, and there will be a further exchange of messages to determine a new designated node.

Figure 2A:
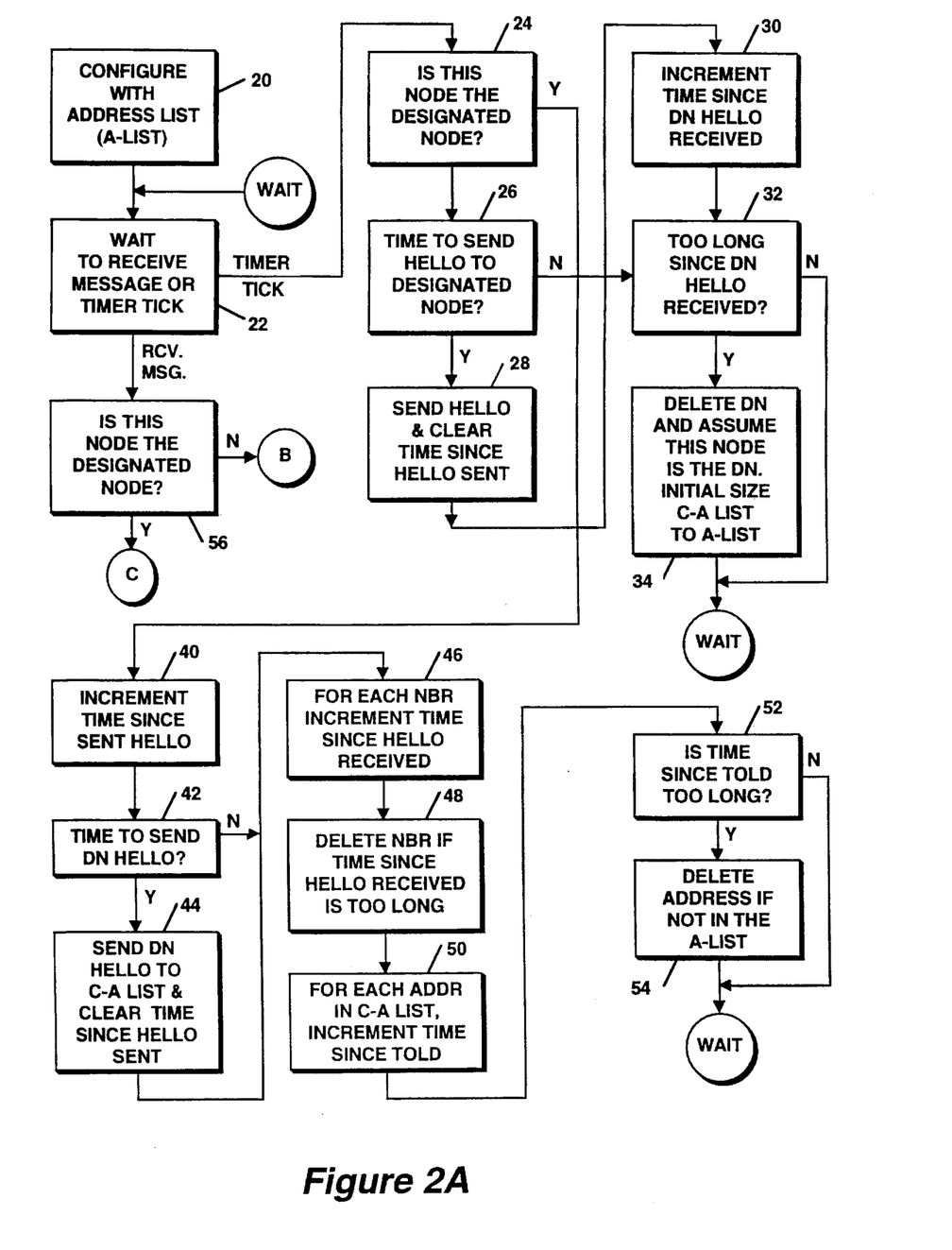
FIGS. 2A–2C together comprise a flowchart showing the functions performed in each node in accordance with the invention.
Figure 2B:
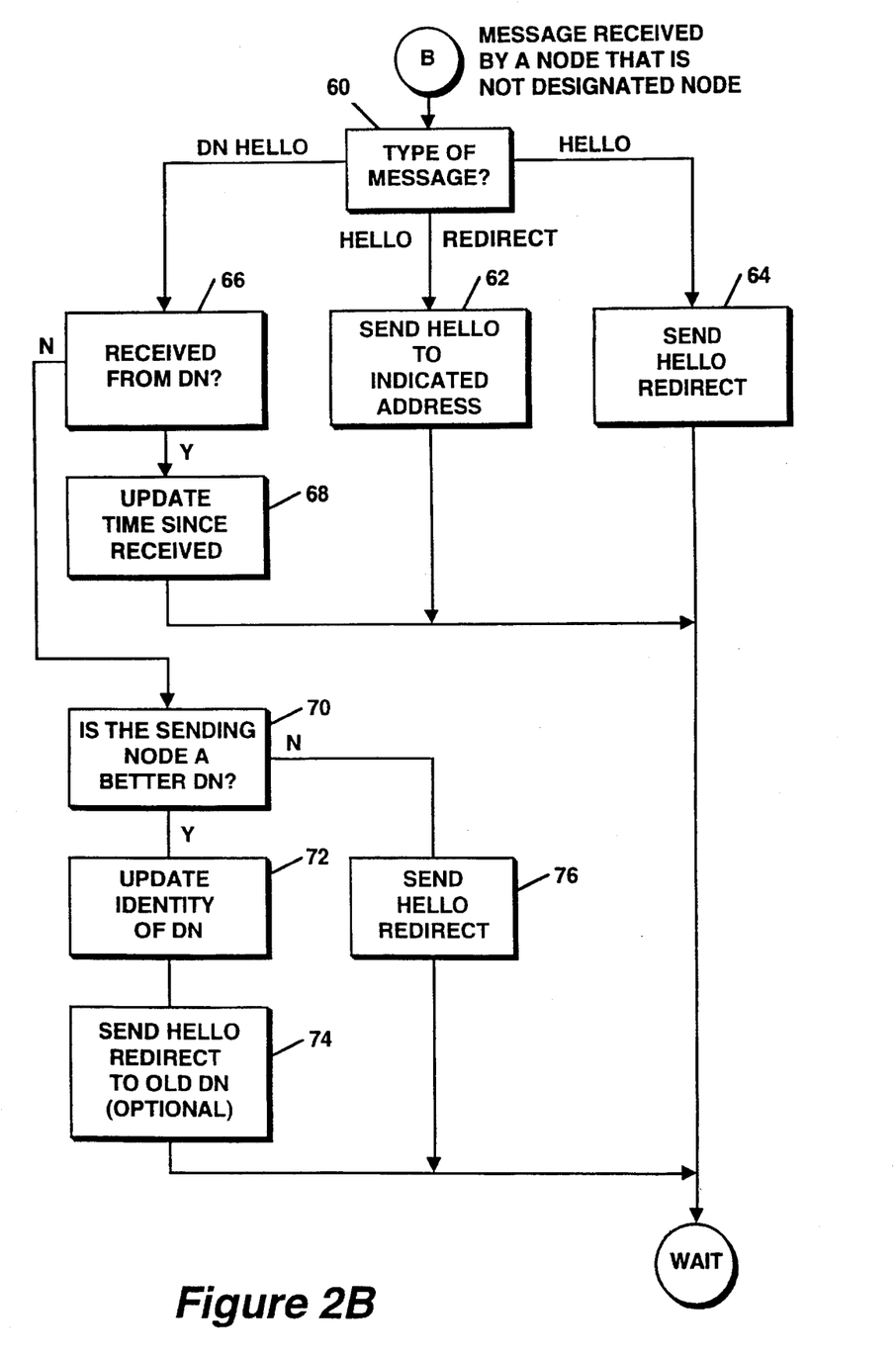
Figure 2C:
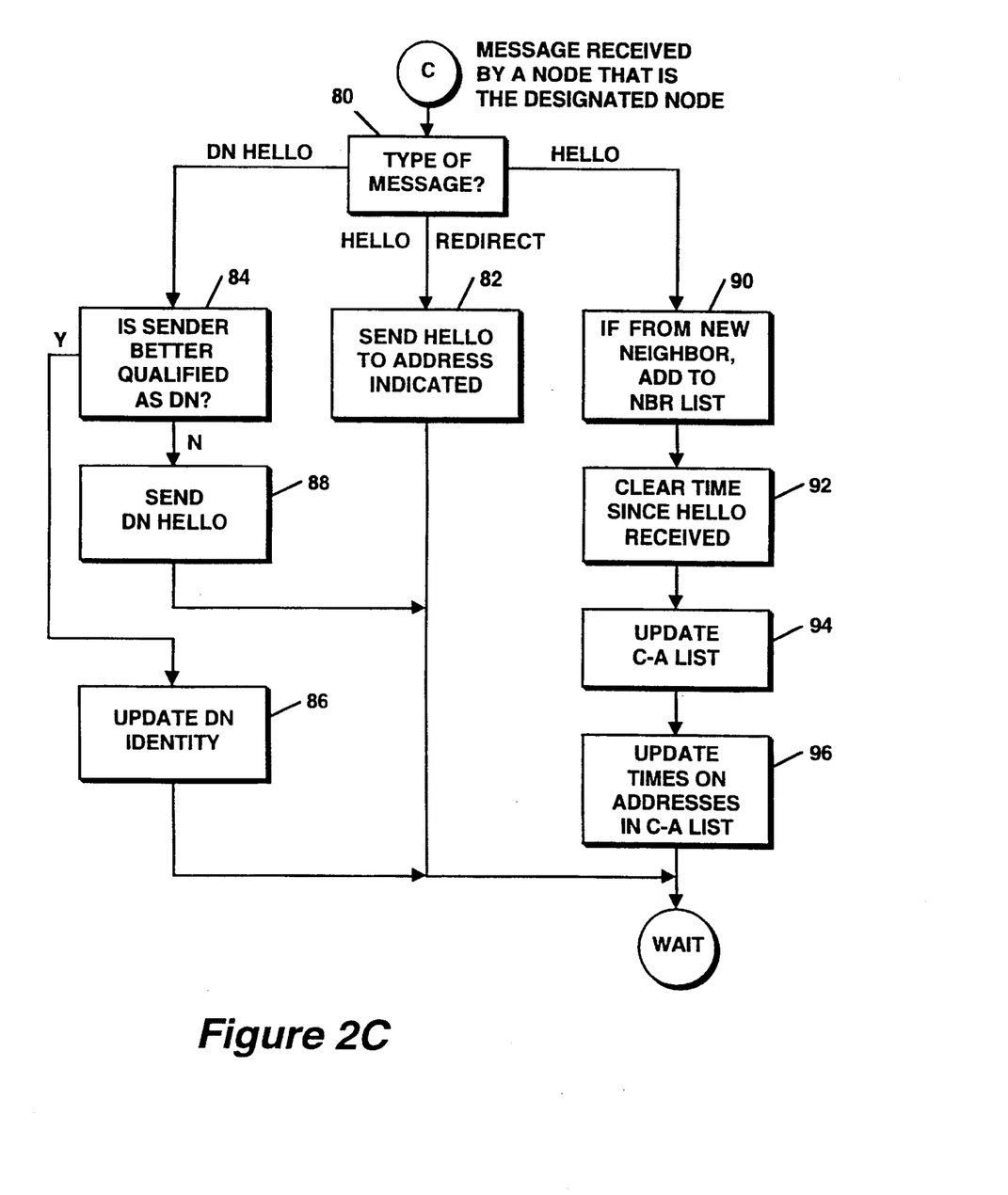

The foregoing simple example of how the invention operates in the context of a network with a small number of operational nodes should make the following more general description easier to understand, with reference to the flowcharts of FIGS. 2A–2C. As indicated in block 20 of FIG. 2A, a necessary preliminary step in the method of the invention is manually configuring each of the nodes to include a partial list of node addresses, which will be referred to as the initial address list, or the A-list. The A-list will, in general, be different for each node. The only requirement is that the subsets of node configurations defined by the A-lists be overlapping such that no subset is isolated from the others. For example, one could not configure the nodes in isolated pairs N1:N2, N3:N4, and so forth, with no coupling between the pairs. This paired configuration would result in N3 and N4 having knowledge of each other, but with no way for either of them to learn of the existence of N1 and N2.

The designated node, or a node that believes itself to be the designated node, maintains two address lists in addition to its initially configured A-list. These are the compiled address list, referred to as the C-A-list, and the neighbor list, abbreviated as NBR list in the drawings.

The C-A-list is initialized to be the same as the A-list, at the same time as manual configuration in block 20, and is augmented when the designated node receives Hello messages from other nodes. The C-A-list is compiled as a combination of the following four sets of addresses:

(a) All addresses that the designated node has been manually configured with;

(b) All addresses that other nodes have been manually configured with, as learned from Hello messages recently received from the other nodes;

(c) All unicast addresses for nodes from which the designated node has recently received a Hello message, as learned from a header in the Hello messages; and (d) Any multicast addresses used by other nodes from which the designated node has recently received a Hello message, as learned from a multicast address field in the Hello message.

As discussed earlier, the communication systems with which the present invention is concerned use a nonbroadcast medium and do not have a true multicast capability. However, some such systems permit a limited number of nodes to be defined as being addressable through a single group address. The present invention can be easily adapted to handle such a scheme. For example, if nodes N3, N4 and N5 were addressable by a single group address G1, each of the nodes would include the group address G1 in its Hello messages to the designated node. The designated node would then send a DN Hello message only to the group address G1 rather than to each of the nodes N3, N4 and N5 making up the group.

Therefore, an additional step that the designated node performs in forming its list of addresses to which the DN Hello messages will be sent, is to remove from the list any redundant entries that occur because a node can be addressed through a group address. Thus a node in category (c) above will be deleted from the list if a Hello message indicates that the nodes may also be addressed through a group address included in category (d). Note also that the combination of categories (a), (b) and (c) also eliminates any double inclusion of nodes that may be in more than one category. The list formed by this process is used as a "mailing list" of nodes to which DN Hello messages will be sent.

As will become apparent from the description of the flowchart in FIGS. 2A–2C, compiling and maintaining the C-A-list also includes pruning "stale" items from the list. For example, if a Hello message has not been received from node N5 for a preselected time, node N5 will be deleted from the list.

The other list maintained by the designated node, the neighbor list, is initialized to be empty, and is augmented whenever the designated node receives a Hello message from a neighbor node. Thus the neighbor list is a list of the addresses of all of the currently active nodes. As will also become apparent from the flowchart, the neighbor list is pruned whenever the designated node determines that a neighbor node has stopped sending Hello messages.

Both the designated node and the other active nodes use various timers to keep track of when to send DN Hello messages and Hello messages. The designated node uses additional timers in the management of its C-A-list and its neighbor list. These timers may take any suitable form. In a software implementation, a timer may be a counter that is cleared to zero at an appropriate time, then incremented periodically upon the occurrence of a timer "tick," such as every second. Alternatively, the determination of elapsed time may be effected by comparing two "time stamps" obtained from a system clock at different instants in time. For purposes of illustration, the timers referred to in this description are assumed to be timer tick counters.

As shown in FIG. 2A, after configuration with the A-list, the node goes into a wait state, indicated in block 22, where it waits for the occurrence of either a timer tick or the reception of a message from another node. Further processing in the event of a timer tick or a received message then depends on whether the node is the designated node or not. Processing in the event of a timer tick is shown in FIG. 2A, and processing in the event of a received message is shown in FIGS. 2B and 2C.

When a timer tick occurs, the next processing step is to determine whether this node is the designated node, as indicated in block 24. Each node has a designated node identity, i.e. the address of the node that it currently believes is the designated node.

If this is not the designated node, the next step in the process is to determine whether it is time to send a Hello message to the designated node, as indicated in block 26. If so, a Hello message is sent and a "time since Hello sent" timer is cleared, as indicated in block 28. If not, the step of block 28 is bypassed. Then another timer, the "time since DN Hello received" timer, is incremented (as shown in block 30), to record the number of timer ticks that have occurred since the last DN Hello message was received at this node. If too much time has elapsed since receiving the last DN Hello message, as determined in block 32, this node assumes that the designated node has ceased operation, and declares itself to be the designated node, as indicated in block 34. The process then initializes the C-A-list to have the same content as the A-list, and reverts to the wait state (block 22) until the next timer tick or received message is detected. If this node continues to receive DN Hello messages, the latter step (in block 34) will be bypassed. In summary, then, timer tick processing for a node other than the designated node consists of sending a Hello message periodically, and declaring itself the designated node if no DN Hello message has been received for some time.

Timer tick processing for the designated node is shown in the bottom half of FIG. 2A. A "time since sent DN Hello" timer is incremented, as indicated in block 40, and if it is time to send a new DN Hello message (as determined in block 42) the DN Hello is sent to each address in the C-A-list maintained by the designated node, as indicated in block 44. The "time since DN Hello sent" is cleared, and begins timing another preselected period until the next DN Hello message is to be sent.

Timer tick processing in the designated node then performs some housekeeping operations on various timers. The designated node maintains a "time since Hello received" timer for each node whose address is the neighbor list. It will be recalled that the neighbor list is a list of addresses of nodes that have recently send Hello messages to the designated node. (Generation of the neighbor list is described in relation to the processing of received messages, in FIG. 2C.) Each "time since Hello received" timer is incremented, as indicated in block 46, and if any timer exceeds a predefined maximum time, the corresponding neighbor address is deleted from the neighbor list, as indicated in block 48.

Timer tick processing then performs maintenance operations on another set of timers, a "time since told" timer associated with each address in the C-A list. Each timer is cleared when a Hello message is received with information about the node associated with the address in the C-A-list, and is incremented at each timer tick, in processing block 50. If too much time elapses before one of these counters is cleared again, as determined in block 52, this indicates that the corresponding node is probably no longer active, and therefore the corresponding address should be deleted from the C-A-list, as indicated in block 54, so long as the address is not also in the A-list for the designated node. At the conclusion of timer tick processing, the designated node reverts to the wait state (block 22), to await the next timer tick or received message.

When a node receives a message, it first determines whether or not it is the designated node, as indicated in block 56. Processing of the received message for a node that is not the designated node is performed as shown in FIG. 2B (reached through connector B from FIG. 2A). Processing of the received message for the designated node is performed as shown in FIG. 2C (reached through connector C from FIG. 2C). Processing in a non-designated node will be described first, with reference to FIG. 2B.

The message type is first determined, as indicated in block 60. There are three types of messages of interest: a DN Hello message, a Hello Redirect message, and a Hello message. When the received message is a Hello Redirect message, this indicates that some other node is requesting that this node send a Hello message to a different address from the one being currently assumed to be the designated node address. The appropriate response is for this node to send a Hello message to the address indicated in the Hello Redirect message, as shown in block 62. Processing is complete at this point and the node reverts to the wait state (block 22, FIG. 2A).

If this node receives a Hello message, this indicates that some other node considers this node to be the designated node. Since it is not, the appropriate response is to send a Hello Redirect message back to the source of the Hello message, as indicated in block 64, providing the address of the real designated node in the Hello Redirect message.

If a DN Hello message is received, this node first makes sure that the message was from the node it believes to be the designated node, as indicated in block 66. If so, the only further processing needed is to clear a "time since received DN Hello" timer maintained in each non-designated node, as indicated in block 68, and to return to the wait state.

If the DN Hello message was received from a node that this node does not believe is the designated node, the process determines, in block 70, whether the sender of the DN Hello message is better qualified than the node that this node believes is the designated node. If so, this node updates its designated node identity to reflect the identity of the DN Hello sender, as indicated in block 72. Optionally, as indicated in block 74, this node may send a Hello Redirect message to the old designated node address. This optional action will speed up the transition to the new designated node, at the expense of sending another message. If the sender of the DN Hello message is not better qualified than the designated node, this node sends a Hello Redirect message to the sender of the DN Hello message, as indicated in block 76, to inform of the identity of the real designated node. In any event, processing of the DN Hello message concludes with a return to the wait state (block 22, FIG. 2A).

Processing of a received message in the designated node proceeds as illustrated in FIG. 2C. As in other nodes, the type of message is first determined, as shown in block 80. If the message type is a Hello Redirect, the only required action is to send a Hello message to the address indicated in the receive message, as shown in block 82, and then to return to the wait state. If a DN Hello is received in the designated node, the sender of the message is found in the message header and a determination is made (in block 84) as to whether the sender is a better candidate for designated node. If so, this node updates its designated node identity, as shown in block 86, and returns to the wait state. If not, this node sends a DN Hello message to the sender, as shown in block 88, and reverts to the wait state.

Since this is the designated node, a more likely event is the receipt of a Hello message from one of the other nodes. Processing on receipt of a Hello message first requires identifying the source of the Hello message and, if it is from a new neighbor not previously heard from, adding the new neighbor's address to the neighbor list, as indicated in block 90. The node then clears the appropriate "time since Hello received" timer, corresponding to the neighbor from which the message was received, as shown in block 92. The next step is to update the C-A-list, if necessary, using address information contained in the received Hello message, as shown in block 94. Finally, as indicated in block 96, the node clears "time since told" timers corresponding to addresses in the C-A-list, about which the designated node received information in the message. These timers are cleared whenever the designated node is told (in a Hello message) of the existence of the corresponding node addresses, and are incremented in the timer tick processing. If a node address is not referenced in any Hello message for some preselected time, it is deleted from the C-A-list, as described earlier with reference to FIG. 2A. Processing the received Hello message concludes by a return to the wait state, block 22 (FIG. 2A).

The foregoing description of the flowchart of FIGS. 2A–2C covers the mechanics of how the designated node is selected and how Hello messages and DN Hello messages are exchanged. The principal components of these messages, will now be briefly discussed. It will be understood that the messages may have other components not pertinent to the present invention.

The Hello message contains: the source address (the address of the node sending the Hello message), a multicast address (if the node sending the Hello message can be reached through group address), a relative priority for being the designated node, and a list of manually configured node addresses.

The DN Hello message contains: the source address, a relative priority for being the designated node, a list of addresses of nodes that the sender of the DN Hello message believes to be a complete identification of all active nodes, and the lowest and highest addresses in the list. The address range is provided for those instances in which the list is too long to fit in a single data packet and must be divided into multiple packets. Nodes receiving the DN Hello message can determine from the address range whether or not they have missed any segment of the DN Hello message. Without the address ranges, a recipient of a segmented DN Hello message may miss receiving a segment but be unaware of it.

The Hello Redirect message contains: a destination address (to which the Hello Redirect message is sent), and a redirect address (to which the destination node is being requested to send its Hello messages).

It will be appreciated from the foregoing that the present invention represents a significant advance in the field of neighbor identification protocols for communication networks using a nonbroadcast communication medium. In particular, the invention provides a simple technique for generating, distributing and maintaining a list of active nodes. The overhead incurred in accomplishing this goal in accordance with the invention is proportional to the number of nodes N, rather than to $N^2$. It will also be appreciated that, although the invention has been described in detail for purposes of illustration, various modifications may be made without departing from the spirit and scope of the invention. Accordingly, the invention should not be limited except as by the appended claims.

We claim:

1. A neighbor node discovery method having a plurality of nodes connected to a communications network, each of said nodes having an address, said method comprising the steps of:

configuring each of said plurality of nodes connected to said communication network, such that each node of said plurality of nodes is aware of a subset of said addresses for reaching selected nodes identified by said subset of said addresses;

collectively, among said plurality of nodes connected to said network, agreeing upon a designated node;

periodically sending a hello message of a first type to said designated node from each other node of said plurality of nodes (herein the term "other node" refers to all of said plurality of nodes except said designated node), wherein each hello message of said first type identifies a sending node and said subset of said addresses that said sending node has been configured with for reaching said selected nodes; and, periodically sending a hello message of a second type from said designated node to each of said other nodes, wherein each hello message of said second type contains a list of addresses derived in part from received hello messages of said first type.

2. A method as defined in claim 1, wherein the step of collectively agreeing upon a designated node includes the following steps performed in each node of said plurality of nodes:

assuming that a second selected node (referred to hereinafter as "this node") of said plurality of nodes is the designated node, and sending periodic hello messages of the second type from this node to each node known to this node;

if this node receives a hello message of the second type from a node better qualified than this node's current selection for designated node, changing this node's current selection for designated node to the node from which the hello message of the second type was received;

if this node is not the designated node and this node receives a hello message of the second type from a node not better qualified than this node's current selection for designated node, sending a hello redirect message to the node from which the hello message of the second type was received, to inform the latter node that there is a more qualified choice for designated node;

if this node is the designated node and this node receives a hello message of the second type from a node not better qualified than this node to be the designated node, sending a hello message of the second type to the node from which the hello message of the second type was received; and, if this node receives a hello redirect message from another node, sending a hello message of the first type to a new candidate for designated node;

whereby agreement is eventually reached as to the identity of the designated node.

3. A method as defined in claim 2, wherein:

the designated node is selected on the basis of a unique property of each node of said plurality of nodes, such as identification number.

4. A method as defined in claim 1, wherein the step of periodically sending said hello message of a second type from the designated node to each of the other nodes includes:

compiling a composite node list from sources, including (i) the addresses that the designated node has been configured with, (ii) the addresses that other nodes have been configured with, as learned from received hello messages of the first type, (iii) the addresses of nodes from which the designated node has received said hello messages of the first type, and (iv) any multicast addresses used by other nodes from which the designated node has received a hello message of the first type; and, maintaining a neighbor list, containing the addresses of all neighbor nodes from which hello messages of the first type have been recently received by the designated node.

5. A method as defined in claim 4, wherein the step of compiling said composite node list includes:

eliminating duplicate entries in said composite node list, to minimize the number of hello messages of the second type.

6. A method as defined in claim 4, wherein the step of periodically sending a hello message of the second type includes:

incorporating the neighbor list into the hello message of the second type;

fragmenting the hello message of the second type into multiple data packets, if the message is too long to fit into one packet; and, including in each fragment of the hello message an address range spanning all of the node addresses included in the fragment, whereby nodes receiving the fragmented hello message can more easily determine whether any portion of the hello message is missing.

7. A method as defined in claim 1, wherein each node (hereinafter "third selected node") of said plurality of nodes sending a hello message of the first type to the designated node performs the subsequent steps of:

waiting for a preselected time interval to detect a hello message of the second type from the designated node; and, if a hello message of the second type is not received within the preselected time interval, assuming again that said third selected node is the designated node and sending periodic hello messages of the second type to all the other nodes known to said third selected node.

8. Apparatus for neighbor node discovery, the apparatus comprising:

means for configuring each of multiple nodes connected to a communication network, such that each node of said multiple nodes is aware of a subset of addresses for reaching a subset of nodes in the network;

means for collectively agreeing, among operational ones of said multiple nodes connected to the network, upon a designated node;

means in each node of said multiple nodes for periodically sending a hello message of a first type to said designated node from each other node of said multiple nodes (herein the term "other node" means all operational ones of said multiple nodes except said designated node), wherein each hello message of the first type identifies the sending node and the addresses that the sending node has been configured with; and, means in each node of said multiple nodes for periodically sending a hello message of a second type from the designated node to each of the other nodes, and each hello message of the second type contains a list of the nodes of said multiple nodes from which said hello message of the first type were received, as derived in part from received hello messages of the first type.

9. Apparatus as defined in claim 8, wherein the means for collectively agreeing upon a designated node includes:

means in each node of said multiple nodes (hereinafter referred to as "this node") for initially assuming that this node is the designated node;

means operational only if this node receives said hello message of the second type from a better qualified node than this node's current selection for said designated node, for changing this node's current selection for said designated node, to said better qualified node;

means operational only if this node is not the designated node and receives a hello message of the second type from a node not better qualified than this node's current selection for designated node, for sending a hello redirect message to said not better qualified node, to inform said not better qualified node that there is a more qualified choice for the designated node;

means operational only if this node is the designated node and this node receives a hello message of the second type from a node not better qualified than this node to be the designated node, for sending a hello message of the second type to the node from which the hello message of the second type was received; and, means operational only if this node receives a hello redirect message from another node, for sending a hello message of the first type to a new candidate for designated node;

whereby agreement is eventually reached as to the identity of the designated node.

10. Apparatus as defined in claim 9, wherein:

the designated node is selected on the basis of a unique property of each node of said multiple nodes, such as identification number.

11. Apparatus as defined in claim 8, wherein the means for periodically sending said hello message of a second type from the designated node to each of the other nodes of said multiple nodes includes:

means for compiling a composite node list from sources, including (i) the addresses that the designated node has been configured with, (ii) the addresses that other nodes have been configured with, as learned from received said hello messages of the first type, (iii) the addresses of nodes from which the designated node has received said hello messages of the first type, and (iv) any multicast addresses used by other nodes from which the designated node has received a hello message of the first type, and, means for maintaining a neighbor list containing the addresses of all neighbor nodes from which hello messages of the first type have been recently received by the designated node.

12. Apparatus as defined in claim 11, wherein the means for compiling a composite node list includes:

means for eliminating duplicate entries in the compiled list, to minimize the number of hello messages of the second type.

13. Apparatus as defined in claim 11, wherein the means for periodically sending a hello message of the second type includes:

means for incorporating the neighbor list into the hello message of the second type;

means for fragmenting the hello message of the second type into multiple data packets, if the message is too long to fit into one packet; and, means for including in each fragment of the hello message an address range spanning all of the node addresses of said neighbor list included in the fragment, whereby nodes of said multiple nodes receiving the fragmented hello message can more easily determine whether any portion of the hello message is missing.

14. Apparatus as defined in claim 8, wherein said each node sending a hello message of the first type to the designated node further includes:

means for waiting for a preselected time interval to detect a transmitted hello message of the second type from the designated node; and, means operational if a hello message of the second type is not received within the preselected time interval, for assuming again that said each node is the designated node and sending periodic hello messages of the second type to all the other nodes known to said each node.

* * * * *